April 25, 1950 — E. WILDHABER — 2,505,269

METHOD OF PRODUCING GEARS

Filed June 14, 1946 — 2 Sheets-Sheet 1

INVENTOR
ERNEST WILDHABER
BY
Attorney

April 25, 1950 E. WILDHABER 2,505,269
METHOD OF PRODUCING GEARS
Filed June 14, 1946 2 Sheets-Sheet 2
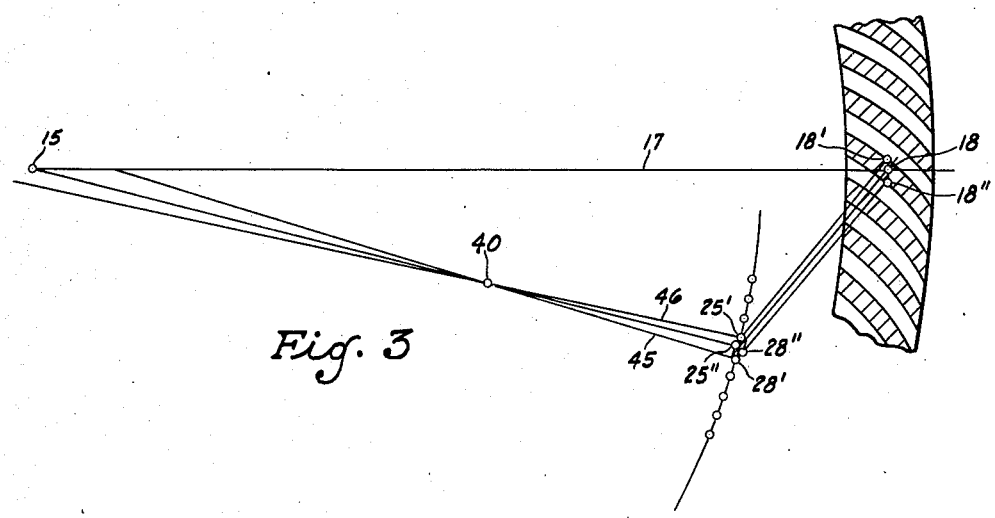
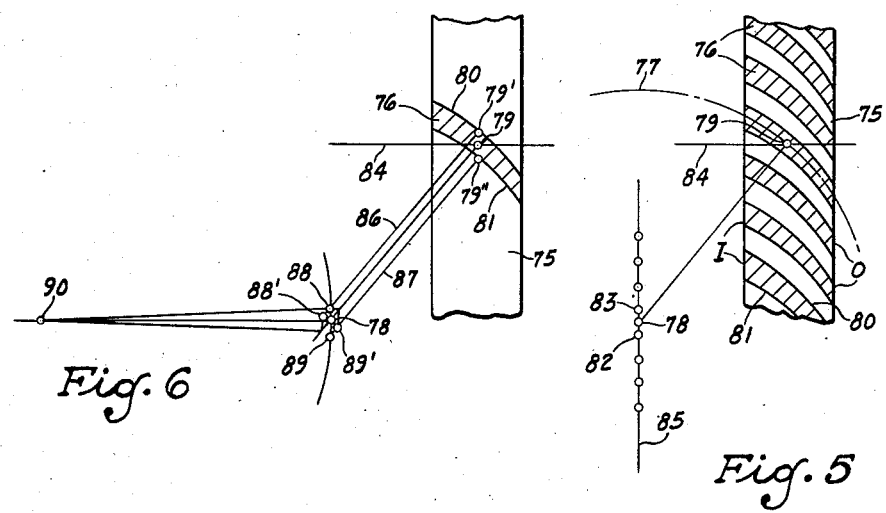
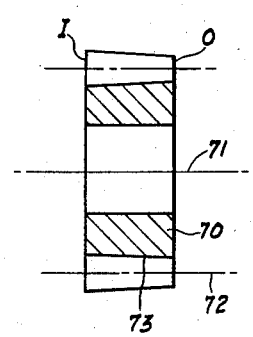
INVENTOR
ERNEST WILDHABER Patented Apr. 25, 1950

2,505,269

UNITED STATES PATENT OFFICE 2,505,269

METHOD OF PRODUCING GEARS

Ernest Wildhaber, Brighton, N. Y., assignor to Gleason Works, Rochester, N. Y., a corporation of New York Application June 14, 1946, Serial No. 676,678

15 Claims. (Cl. 90—5)

The present invention relates to longitudinally curved tooth gears and especially to longitudinally curved tooth gears whose teeth are inclined lengthwise to the straight line elements of the pitch surfaces of the gears. In particular the invention relates to tapered gears which have longitudinally curved teeth and whoses axes are inclined to one another, at an angle of thirty degrees or less. The invention is applicable also, however, to gears which mesh with axes parallel.

The standard method of generating bevel gears is to generate each member of the pair conjugate to a crown gear whose axis intersects the axis of the blank in the cone apex of the blank. Where the gears, which are to be cut, have a small angle between their axes, this method of cutting has several disadvantages. In these gears, the cone distance, or distance between the cone apex of the gear and a mean point in the center of its tooth face, is long in proportion to the width of the tooth face, and if each gear is generated conjugate to a crown gear whose axis intersects the gear axis in the cone apex of the gear, a gear generating machine is required of a size altogether out of proportion to the size of the gear to be cut. Moreover, such a gear generating machine is slow and costly to operate.

It is therefore the practice to generate angular bevel and hypoid gears of long cone distance and small shaft angle on gear generating machines having a much smaller capacity as regards cone distance than the cone distance of the gears to be cut. This can be done by a process such as described, for instance, in my Patent No. 2,310,484 of Feb. 9, 1943. But even with such methods as have been employed, heretofore, for cutting long cone distance tapered gears it has been difficult to cut the gears on a machine of reasonable size with cutters or grinding wheels of practical diameter. Moreover, with such methods, at least one member of the pair has to have its teeth cut one side at a time. Furthermore, there are limitations as to the spiral angles which can be produced.

One object of the present invention is to provide a new tooth shape for longitudinally curved tooth tapered gears which will permit of cutting opposite sides of the tooth spaces of both members of a pair of such gears simultaneously.

A further object of the invention is to provide a new tooth shape for longitudinally curved tooth gears which may be applied not only to tapered gears of small cone angle, but to longitudinally curved tooth gears which mesh with their axes at zero angle of inclination, that is, with their axes parellel, and which will permit of cutting opposite sides of the tooth spaces of such gears simultaneously.

Another object of the invention is to provide a method for cutting longitudinally curved tooth gears, which mesh with their axes inclined at a small angle, which is free of limitation as to the spiral angles which may be cut, and with which spiral angles large enough for quiet operation at high speed may be provided.

A further object of the invention is to provide a method for cutting longitudinally curved tooth gears, which mesh with their axes inclined at a small angle or at zero angle, on machines of a size proportionate to the size of the gears themselves.

Still another object of the invention is to provide a method for cutting longitudinally curved tooth gears, which mesh with their axes at a slight angle or zero angle, in which a cutter or grinding wheel may be employed of much smaller diameter than would ordinarily be used in the cutting of these gears, and which is of a size within the capacity and range of a gear cutting or gear grinding machine that is of a size proportionate to the size of the gears.

Still another object of the invention is to provide a method for cutting longitudinally curved tooth gears, which mesh with axes at zero inclination, that is, parallel, which may be practiced on a standard machine for cutting spiral bevel or hypoid gears.

Other objects of the invention will be apparent hereinafter from the specification and from the recital of the appended claims.

Gears produced according to the present invention have teeth which are of greater thickness in the pitch plane at the ends of the teeth, where the spiral angle of the teeth is smaller, than at the ends where the spiral angle is greater. This is just the reverse of conventional practice. For longitudinally curved tooth tapered gears, this means that the teeth are thicker in the pitch plane at their inner ends than at their outer ends.

To compensate for this, longitudinally curved tooth gears made according to the present invention have teeth of greater depth at the end where the spiral angle is smaller than at the end of greater spiral angle. Again, this is just the reverse of conventional practice. For longitudinally curved toothed tapered gears, this means that the teeth are deeper at their inner ends than at their outer ends. This, however, balances the change in tooth thickness.

In generating bevel gears according to this invention both sides of a tooth space are preferably cut simultaneously on both members of a gear pair; generation is effected about an axis off-set from the gear axis and not intersecting the gear axis in the gear apex as in conventional practice; the axis of generation is between the gear apex and the center of curvature of its teeth; a varying ratio of roll is employed to produce the desired tooth profile shapes; a cutter or grinding wheel of relatively small radius is employed; and this tool has cutting edges preferably of larger pressure angle than the pressure angle of the tooth surfaces to be produced so that the gear is rolled as though it were rolling with a surface outside its pitch surface on the pitch surface of the crown gear or other basic gear represented by the tool.

In the drawings:

Fig. 3 is a diagrammatic view similar to Fig. 1 and further illustrating the principles upon which the present invention rests;

Fig. 5 is a diagrammatic view similar to Fig. 4 illustrating the application of the present invention to the production of cylindrical gears, that is, gears which are to mesh with their axes parallel;

Fig. 6 is a diagrammatic view similar to Figs. 3 and 5, illustrating a modified method of generating cylindrical gears according to the present invention; and Fig. 7 is an axial sectional view of a cylindrical gear produced according to one embodiment of this invention.

Figures 1, 2, 4:
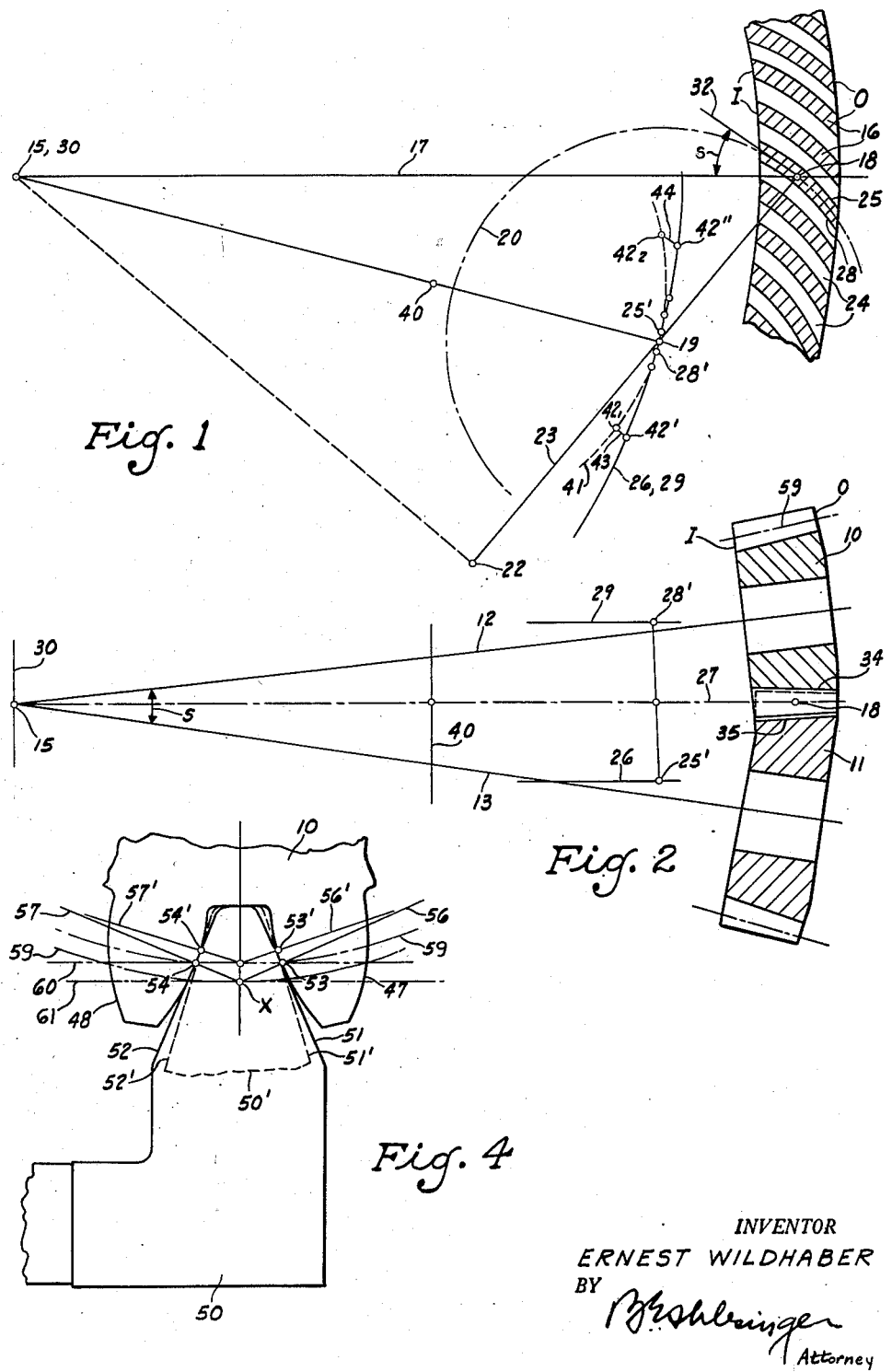
Figure 1 is a diagrammatic view illustrating the present invention, and may be considered as a section taken through the pitch plane of a basic crown gear conjugate to a tapered gear produced according to one embodiment of this invention, or as a development into its pitch plane of a bevel gear produced according to one embodiment of this invention.
Fig. 2 is an axial sectional view of a bevel gear pair constructed according to the present invention and corresponding to the embodiment illustrated in Fig. 1.
Fig. 4 is a diagrammatic view illustrating the effect of using a cutter or grinding wheel of larger pressure angle than the gears themselves in the production of gears according to this invention.

In Fig. 2, 10 and 11 denote, respectively, the two members of a pair of long cone distance bevel gears constructed according to the present invention. The axes 12 and 13, respectively, of these gears include an angle S with each other which is smaller than thirty degrees.

15 is the common cone apex of these gears which is the point of intersection of their axes. The gears have longitudinally curved teeth which are inclined to the pitch line elements of the gears. Fig. 1 may be considered as a development into the pitch plane of either one of the gears, or as a section in the pitch plane of the basic crown gear to which either gear is generated conjugate. As is shown, the gear has longitudinally curved teeth 16 which are inclined to its pitch line element 17.

18 denotes a mean point in the pitch surface of the gear shown in development, and 18—19 is the mean radius of curvature of the teeth 16 of the gear, the arc 20 indicating the mean curvature circle of a gear tooth. As is seen, the mean cone distance 15—18 of the gear is quite large as compared with the diameter of the gear, and is also quite large as compared with the mean curvature radius 18—19 of its teeth.

Heretofore, it has been the practice to determine the center of lengthwise curvature of the teeth of tapered gears by projecting the cone apex of the gear to a normal to its tooth surface at a mean point in the tooth length. Thus, according to prior practice, the curvature radii for the teeth of longitudinally curved tooth tapered gears 10 and 11 would be no less than the radius 18—22, where 22 denotes the point of projection of the cone apex 15 to the tooth normal 23 at the mean point 18. With the present invention, a radius 18—19 is selected for the gear teeth which will permit using a cutter or grinding wheel which is within the range of a gear cutting machine or gear grinding machine proportional in size to the gears being cut. Furthermore, with the present invention, the tooth spaces of the gears are made of uniform width from end to end measured at their roots so that opposite sides of each tooth space can be cut or ground simultaneously with a face mill cutter or annular grinding wheel. With this construction, the teeth 16 of the gears are wider at their inner ends I, where the spiral angle or inclination of the teeth is smaller, than at their outer ends O, where their inclination or spiral angle is larger. In other words, the teeth 16 of the gear shown in Fig. 1 are thicker at the smaller cone distance than at the larger cone distance, their thickness increasing with decreasing cone distance and with decreasing spiral angle.

To balance the variation in thickness of the teeth, gears made according to the present invention have the further characteristic that the teeth are deeper where they are thicker, that is, that their depth increases from the outer to the inner ends of the teeth, namely, increases with the decreasing spiral angle.

Preferably, the gears are generated substantially conjugate to basic crown gears or basic members whose side tooth surfaces are surfaces of revolution, such as conical or spherical surfaces. Thus, the tooth side 25 of the basic crown gear may be made a convex spherical surface, centered at 25' and lying on a circle 26 below the pitch plane 27 (Fig. 2) of the crown gear. Likewise, the tooth side 28 of the basic crown gear may be made a concave spherical surface centered at 28'. The sphere centers of the various teeth of the crown gear all lie on the circles 26 and 29 which are centered on the axis 39 of the crown gear. This axis passes through cone apex 15. The sphere centers of several adjacent tooth sides are shown in Fig. 1, but only such as 25' and 28', to which specific reference is made, have been designated by reference numerals. Mating tooth surfaces of the gears will be fully matched when the basic crown gears, to which the two gears 10 and 11 are generated conjugate, are exactly complementary.

Instead of having the teeth fully match one another, however, it is preferable, as is customary in spiral bevel and hypoid gearing, to make the teeth so that they have less than full length tooth bearing or contact, the bearing being eased off toward the ends of the teeth. This can be accomplished by using basic generating gears and cutters or grinding wheels which represent those gears, whose convex spherical surfaces are of larger radii than the radii of the concave spherical surfaces of those gears or tools. In any event, whether the tooth surfaces are fully matched or not, the two sides of a crown gear tooth employed for generating gears according to this invention can be represented by a single face-mill cutter or annular grinding wheel whose axis passes through the two sphere centers of opposite sides of the crown gear tooth. The opposite sides of the tooth space can be simultaneously generated in a rolling operation, for instance, in which the crown gear, which is represented by the tools, rolls and meshes with the gear to be cut. When a tooth space has been cut, the tool is withdrawn from engagement with the gear and the gear is indexed, and then the next tooth space is produced, and so the operation continues until the gear is completed.

The crown gear tooth represented by the single rotary cutter has, of necessity, a constant top land for the tip cutting edges of the cutter will sweep out such a surface. By properly positioning the cutter with reference to the blank, however, gear teeth will be produced in the blank, such as shown in Fig. 2, whose depth is greater at the inner ends I than at the outer ends O of the teeth. The gears, therefore, have teeth whose depth changes from the outer to the inner end in correspondence with the change in normal thickness of the teeth from end to end. The tooth strength is thereby well balanced along the whole length of the teeth from their outer to their inner ends.

If we let A denote the mean cone distance 15—18 of the gears, $r$ the curvature radius 18—19, which is also the mean radius of the tool employed in producing the gears, and $s$ the mean spiral angle, that is, the inclination of a tangent 32 at mean point 18 to the pitch cone element 17, then:

Distance (15—22) = $A.\cos s$
Distance (18—22) = $A.\sin s$

The root lines 34 and 35 of mating gears are preferably inclined at an angle $d$ to each other which is such as to permit simultaneous generation of opposite sides of each tooth space on both members 10 and 11 of a gear pair.

It can be demonstrated mathematically that angle $d$, which corresponds to such simultaneous generation, may be computed as follows:

$$d = \frac{180°}{N_c \tan p. \cos s}\left(\frac{A \sin s}{r} - 1\right)$$

Here angle $d$, which is the sum of the dedendum angles of the two gears, is given in degrees; $p$ denotes the pressure angle of the gears, that is, the inclination of a normal to the tooth surface of the gear at mean point 18 to the pitch plane 27 of the crown gear; and $N_c$ is the number of teeth in the crown gear, which does not have to be an integral number. $N_c$ equals the tooth number $N$ of either gear divided by the sine of the pitch angle $G$ of that gear, or:

$$N_c = \frac{N}{\sin G}$$

The circular pitch of the teeth of the gear is equal to $$\frac{2\pi A}{N_c}$$

and this equals $$\frac{2\pi(A. \sin G)}{N}$$

where ($A \sin G$) is the mean gear radius $R$, that is, the distance of the mean point 18 from the axis 12 of the gear. Since $\frac{A}{N_c}$ is equal to $\frac{R}{N}$ then the above formula can be transformed into:

$$d = \frac{180°}{\tan p. \cos s}\left(\frac{R}{N}\cdot\frac{\sin s}{r} - \frac{\sin G}{N}\right)$$
$$= \frac{180°}{N \tan p. \cos s}\left(\frac{R}{r}\sin s - \sin G\right)$$

In the special case where pitch angle of the gear is zero, that is, where the gear is intended to mesh with its axis parallel to the axis of its mate as discussed further hereinafter, then $\sin G = 0$ and this formula can be transformed into:

$$d = \frac{180°}{N}\cdot\frac{\tan s}{\tan p}\cdot\frac{R}{r}$$

In tapered gears constructed according to the present invention, then, it will be seen that the teeth increase in depth from the outer to the inner ends of the teeth and that the teeth increase in width from the outer to the inner ends of the teeth. Both features are contrary to standard practice in tapered gears.

Where a gear is generated conjugate to a crown gear whose axis is at 30, a gear generator of quite large size must be employed. Such machines are heavy and slow. Moreover, they are expensive and a tooth cutting operation on these machines is costly.

Preferably, gears are generated by the present invention on relatively small size generators which are faster and less expensive, and according to a preferred method of generation which will now be described. In this method, instead of rolling the gear and cutter relative to one another about an axis 30 of a basic crown gear, whose axis intersects the axis of the blank in its cone apex, the rolling motion is produced about an axis 40, which is parallel to axis 30 and which is located between the cone apex 15 of the gear and the center 19 of tooth curvature of the gear. This reduces the radial setting of the cutter to the distance 40—19 from the distance 15—19.

Each gear of the pair may then be generated by rotating the work on its axis and simultaneously effecting relative motion between the tool and the work about the axis 40 of the generating crown gear. In this motion, the cutter will swing relative to the work on a circle 41 concentric to axis 40. The ratio of generating roll, that is, the ratio of rotation of the blank to the relative motion about axis 40, should be so modified that, at infinitesimal distances away from point 19, the cutter axis will have the positions $42_1$ and $42_2$, respectively, which lie on lines 43 and 44, respectively, that pass through the points $42'$ and $42''$, that denote the opposite ends of the roll in conventional generation. In other words, the angle 19—$42_2$ about axis 40 corresponds to the turning angle 19—$42''$ about axis 15, and likewise, the angle 19—$42_1$ is equal substantially to the angle 19—$42'$. The lines 43 and 44 are parallel to the tangent 32 at mean point 18. The distance 19—$42_2$ is greater than the distance 19—$42_1$. Therefore, to generate proper tooth profiles on the gears 10 and 11, when the axis of the generating gear is at 40, the cutter must be swung at a varying velocity about the axis of the crown gear or cradle during generation. This is in accordance with the basic principles set forth in my Patent No. 2,310,484 above mentioned. By generating both members of the pair in this way, gears 10 and 11 will be produced that are conjugate to each other.

Fig. 3 further illustrates the principle of generating gears according to the present invention with a rotary tool that is swung about axis 40.

18'—25' and 18"—28' denote, respectively, the tooth normals at mean points 18' and 18" in opposite sides of the spherical tooth surfaces of a crown gear tooth. In order to produce teeth which have full tooth bearing or contact, the sphere radii for opposite sides of the teeth should be made equal and the sphere centers should be at 25' and 28', respectively. Actually, as already pointed out, less than full tooth bearing is desirable, in order that the gears may accommodate themselves to the variations in loads and in mountings that they encounter in use. Accordingly, a larger sphere radius is desired on the outside cutting surface and a smaller one on the inside cutting surface. The sphere centers are, therefore, preferably located at 25" and 28", respectively, away from points 25' and 28'. Center 25" is displaced away from point 18' along the tooth normal, while point 28" is displaced toward point 18" along the tooth normal.

Points 18' and 18" are in generating contact with the tooth surface being produced when they pass through the cone element 17, that is, when they are in position 18. Sphere center 25" is below point 25', so that, when point 18' lies on cone element 17, the connecting line with crown gear axis 40 of point 25" in its new position will appear in Fig. 3 as a line 45 which passes to the right of cone center 15. Sphere center 28" is in a raised position on account of the turning motion required to bring the point 18" into coincidence with the point 18. Hence, the line 46, which connects point 28" with center 40, when point 18" has been rotated to position 19, passes to the left of cone center 15. Points 18' and 18" have not been shown in the positions to which they are rotated in generation because the points would overlap other points shown and confuse the illustration.

A proper tooth bearing without bias may be obtained on the gear pair when the lines 45 and 46 coincide with line 15—40. To obtain the desired bearing, when cutting both sides of a tooth space simultaneously, the pressure angle of the tool is increased over the pressure angle of the gears themselves. In other words, a lower pressure angle is generated on the gears than is provided on the rotary tool employed in cutting or grinding them. This is illustrated in Fig. 4 where 50 indicates fragmentarily a rotary face-mill or annular grinding wheel having opposite side cutting edges 51 and 52 whose pressure angles are greater than the pressure angle of the side surfaces 47 and 48 of the gear to be cut. The pressure angles of the sides 51 and 52 of the tool are so selected that the points of contact 53 and 54 between the opposite side cutting edges of the tool and the opposite sides of the tooth space being cut are generated in positions where the sphere centers 25" and 28" of these sides lie on line 15—40. 56 and 57, respectively, are normals to the tooth sides at these points of contact and intersect at X.

If a tool of the same pressure angle as the gear teeth were to be used, such as is shown in broken lines at 50', its opposite side cutting edges 51' and 52', respectively, would contact the side surfaces of the tooth space at 53' and 54', respectively. The normals 56' and 57', respectively, at these points are inclined to the normals 56 and 57. Proper tooth bearing could not be obtained, therefore, if opposite sides of a tooth space were to be cut simultaneously with a tool having the same pressure angle as the pressure angle of the tooth surfaces to be cut.

By changing the generating pressure angle, the two mean points 18' and 18" of opposite tooth sides can be generated in any desired position. They can be generated simultaneously if desired. In this case, the instantaneous axis of generation would have to pass through the normals at points 18' and 18" of the crown gear tooth. It would pass through point 15 and through the intersection point of said normals with that axial plane of the work which contains the work axis 12 and the axis 30 of the basic crown gear. In this case, also, the sphere centers 25" and 28" would be in the shown positions when points 18' and 18" are generating the corresponding points on the gears. Moreover, the lines which connect points 25" and 40 and points 28" and 40 would take the place of lines 45 and 46. These connecting lines pass on opposite sides of the cone center 15 from lines 45 and 46. The simultaneous generation of points 18' and 18", therefore, would produce more of a change than is required to produce desired tooth bearing. The desired bearing can be attained when the increase in generating pressure angle is just enough for the points 18' and 18" to be generated on the work when their sphere centers 25" and 28" are on the line 15—40.

Where a tool, such as the tool 50, is used in generation of a gear according to the present invention, the gear is rolled, of course, with the basic crown gear represented by the tool as though a surface 58, larger than the pitch surface 59 (Fig. 2) of the gear were rolling on the pitch surface 61 of the basic crown gear.

If desired, ease-off of the tooth profiles at top and the bottom can be obtained by properly shaping the cutting edges of the cutter or grinding wheel. Thus, the axial profile of the outside cutting surface may be made less curved than the spherical profile, and the axial profile of the inside cutting surface may be made more curved than the spherical profile, and this is done preferably on both members. Profile ease-off may also be obtained by modified generation.

Instead of using cutters or grinding wheels which have curved cutting edges, tools may be employed which have straight cutting edges, that is, tools may be employed which have conical cutting surfaces. In all cases, the generation with tools, whose pressure angles are increased over the pressure angles at which the gears run, affords a convenient control over the tooth shape and permits of avoiding bias bearing.

The combination of an increased generating pressure angle and an off-set position between the work axis and the axis 40 of the generated member is applicable to drives of any shaft angle such as a right angle. It affords control of the tooth bearing without resorting to a helical generating motion providing that both members of the gear pair are generated.

An application of the principles of this invention to gears which are to run on parallel axes is illustrated in Figs. 5, 6, and 7. Here 70 denotes one member of a pair of gears which are to run with their axes parallel. The axis of this gear is denoted at 71 and its pitch surface at 72, which is a cylindrical surface coaxial of axis 71.

The conventional and natural basic member for generating such a gear is a rack instead of a crown gear. Fig. 5 shows the pitch plane section of a basic rack 75 having teeth 76 which are curved longitudinally and whose spiral angle or helix angle increases from one end I of the teeth to the other end O. The teeth have a larger thickness in the pitch plane in a direction normal to the teeth at the end I of smaller spiral angle than at the end O of larger spiral angle. In accordance with the present invention, they are also made of greater depth at the end I than at the end O, the root lines 73 of the teeth being inclined to the pitch surface 72 and to axis 71 of the gear and converging toward the end I of the teeth.

Preferably, the teeth of the basic rack are made with side surfaces that extend along circular arcs. A mean lengthwise tooth spiral of the teeth is a circular arc such as shown at 77 in Fig. 5 whose center is at 78. The tooth sides 80 and 81 of the teeth of the basic rack may be made spherical surfaces. In the theoretical case of fully matched tooth surfaces, the radii of the convex spherical surfaces are equal to the radii of the concave spherical surfaces and the sphere centers 82 and 83 of the sides 80 and 81, respectively, are then projected into a single line 85. The centers of curvature of several adjacent tooth sides have been shown on this line, but only centers 82 and 83 are designated by numerals.

Preferably, the convex sides 80 of the rack teeth are made spherical surfaces of slightly larger radius than the concave sides 81 to generate teeth on the gears whose concave sides are less curved lengthwise than the convex sides of the teeth.

The tooth surfaces of the gear 70 are preferably cut two sides simultaneously with a face-mill cutter or annular grinding wheel by rotating the cutter or wheel in engagement with the blank while effecting a relative rolling motion between the tool and blank as though the blank were rolling with the basic rack whose tooth is represented by the tool. When one tooth space of the work has been cut or ground, the tool is withdrawn from engagement with the work and the work is indexed. Then the tool and work are reengaged and the next tooth space is generated. When the two members of a pair of gears are generated conjugate to complementary basic racks in the manner described, these two gears are fully conjugate to one another.

Fig. 6 illustrates a modified method of generating cylindrical gears through which the gears may be cut or ground on a spiral bevel or hypoid gear generator. Instead of generating the tooth surfaces by rolling the work with reference to the tool as though the work were rolling on a basic rack, the tool and work are rolled relative to one another about an axis 90 which is so positioned that the center 78 of the tool moves in the same direction as the basic rack would move in generation. In generation, however, the tool blank are rolled relative to one another about the axis 90. 79' and 79'' denote mean points in opposite sides of the teeth of the gear in development and 86 and 87 are normals to the tooth sides at these mean points. 88 and 89 are the centers of curvature of these tooth sides.

When both members of the pair are generated with such centers as these, then full length tooth bearing will be obtained. For localized tooth bearing, a larger sphere radius is desired on the outside cutting surface and a smaller one on the inside cutting surface. Thus, the sphere centers are displaced to points 88' and 89', from points 88 and 89, respectively. With this method, also, an increased pressure angle is required on the tools to obtain the desired shape of tooth bearing when both sides of a tooth space are simultaneously generated. When increased pressure angle tools are used, the work is rolled, of course, with a surface of greater diameter than its pitch surface on the surface of the gear or rack represented by the tool.

Since a grinding wheel is a cutter having an infinite number of cutting edges, it will be understood that where the terms "cutting" and "cutter" are used in the claims, these terms are intended to cover grinding and grinding wheels.

By the method of the present invention, then, it is possible to cut opposite sides of a tooth space of both members of a pair of longitudinally curved tooth gears simultaneously, and by using tools having cutting edges of greater pressure angle than the pressure angle of the tooth sides, which are to be produced, suitable square or oval tooth bearings properly centered on the tooth sides can be obtained. The present invention renders unnecessary, therefore, the employment of a helical generating motion to accomplish this result. In this respect, the invention is applicable to drives of any shaft angle including gears whose axes are at right angles to one another providing that both members of the pair are generated.

While several different embodiments of the invention have been described, then, it is to be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing a cylindrical gear which comprises cutting its teeth by moving a tool across the face of a gear blank in a path which has a varying inclination to straight line elements of the pitch surface of the gear, while effecting a relative rolling movement between the tool and blank as though the gear being cut were meshing with a gear represented by the tool, but varying the ratio of said rolling movement during generation, the tool being so disposed relative to the blank as to cut tooth spaces in the blank of progressively greater depth from the end of the tooth which is of greater inclination to the pitch line elements to the opposite end of the tooth.

2. The method of producing a gear which comprises cutting each of its teeth by moving a tool across the face of a gear blank in a path which has a varying inclination to straight line elements of the pitch surface of the gear, while effecting a relative rolling motion between the tool and blank, the tool being so disposed to the blank as to cut progressively deeper into the blank from the end of the tooth which is of greater inclination to the pitch line elements to the opposite end of the tooth.

3. The method of cutting a pair of longitudinally curved tooth gears which comprises cutting the tooth surfaces of each member of the pair by moving a tool across the face of a gear blank in a path which has a varying inclination to straight line elements of the pitch surface of the gear, while effecting a relative rolling movement between the tool and blank, the tool being so disposed to the blank as to cut teeth which are of progressively greater thickness and which are of progressively deeper from the ends of the teeth which are of greater inclination to the pitch line elements to the opposite ends of the teeth.

4. The method of producing a gear which comprises cutting each of its tooth surfaces by moving a tool across the face of a gear blank in a path which has a varying inclination to straight line elements of the pitch surface of the gear, while effecting a relative rolling movement at a varying ratio between the tool and blank, the tool being so disposed to the blank as to cut progressively deeper into the tooth spaces of the blank from the end of the tooth which is of greater inclination to the pitch line elements to the opposite end of the tooth.

5. The method of producing a gear whose teeth have varying inclination along their lengths to pitch line elements of the gear, which comprises cutting opposite sides of its tooth spaces simultaneously by rotating a tool, which has opposite side cutting edges whose pressure angle is greater than the pressure angle of the tooth surfaces to be cut, in engagement with the gear blank while producing a relative rolling movement between the tool and blank at a varying ratio and as though the blank were rolling with a surface outside its pitch surface on the pitch surface of a gear represented by the tool, the tool being so disposed relative to the blank as to cut tooth spaces in the blank which increase in depth from the end of the tooth, which is of greater inclination to the pitch line elements to the opposite end of the tooth.

6. The method of producing a cylindrical gear which comprises cutting its teeth by moving a tool across the face of a gear blank in a path which has a varying inclination to straight line elements of the pitch surface of the gear, while effecting a relative rolling movement between the tool and blank as though the gear were rolling with a basic rack represented by the tool, the tool being so disposed relative to the blank as to cut tooth spaces in the blank which increase in depth from the end of the tooth which is of greater inclination to the pitch line elements to the opposite end of the tooth.

7. The method of producing a cylindrical gear which comprises cutting its teeth by moving a tool across the face of a gear blank in a path which has a varying inclination to straight line elements of the pitch surface of the gear, while effecting a relative rolling motion between the tool and blank, the tool being so disposed relative to the blank as to cut tooth spaces in the blank of progressively greater depth from the end of the tooth which is of greater inclination to the pitch line elements to the opposite end of the tooth.

8. The method of producing a cylindrical gear whose teeth have varying inclination to pitch line elements of the gear along their lengths, which comprises cutting opposite sides of the tooth spaces simultaneously by rotating a tool, which has opposite side cutting edges whose pressure angle is greater than the pressure angle of the tooth surfaces to be cut, in engagement with the gear blank while producing a relative rolling movement between the tool and blank as though the blank were rolling with a surface outside its pitch surface on the pitch surface of a basic rack represented by the tool, but varying the ratio of the rolling movement during generation, the tool being so disposed relative to the blank as to cut tooth spaces in the blank which increase in depth from the end of the tooth which is of greater inclination to the pitch line elements to the opposite end of the tooth.

9. The method of producing a cylindrical gear which comprises cutting its teeth by moving a tool across the face of a gear blank in a path which has a varying inclination to straight line elements of the pitch surface of the blank, while effecting a relative rolling movement at a varying ratio between the tool and blank about an axis inclined to and offset from the blank axis, the tool being so disposed to the blank as to cut tooth spaces in the blank increasing in depth from the ends of the teeth which are of greater inclination to the pitch line elements to the opposite ends of the teeth.

10. The method of producing a cylindrical gear whose teeth have varying inclination to pitch line elements of the gear along their lengths, which comprises cutting opposite sides of its tooth spaces simultaneously by rotating a tool, which has opposite side cutting edges whose pressure angle is greater than the pressure angle of the teeth to be cut, in engagement with the gear blank while producing a relative rolling movement between the tool and blank at a varying ratio about an axis inclined to and offset from the blank axis as though the blank were rolling with a surface outside its pitch surface on the pitch surface of a gear represented by the tool, the tool being so disposed relative to the blank as to cut tooth spaces in the blank which increase in depth from the ends of the teeth which are of greater inclination to the pitch line elements to the opposite ends of the teeth.

11. The method of producing a tapered gear which comprises cutting its teeth by moving a tool across the face of a gear blank in a path which has a varying inclination to straight line elements of the pitch surface of the blank, while effecting a relative rolling movement between the tool and blank, the tool being so disposed relative to the blank as to cut tooth spaces in the blank which increase in depth from the outer to the inner ends of the teeth.

12. The method of producing a tapered gear which comprises cutting its teeth by moving a tool across the face of a gear blank in a path which has a varying inclination to straight line elements of the pitch surface of the gear, while effecting a relative rolling movement between the tool and blank at a varying ratio, the tool being so disposed relative to the blank as to cut tooth spaces in the blank which increase in depth from the outer to the inner ends of the teeth.

13. The method of producing a tapered gear which comprises cutting two sides of its tooth spaces simultaneously by rotating a tool, which has opposite side cutting edges whose pressure angle is greater than the pressure angle of the teeth to be cut, in engagement with the blank while producing a relative rolling movement between the tool and blank at a varying ratio about an axis angularly disposed to but offset from the axis of the blank and as though the blank were rolling with a surface outside its pitch surface on the pitch surface of a gear represented by the tool, the tool being so disposed relative to the blank as to cut tooth spaces in the blank which increase in depth from the outer to the inner ends of the teeth.

14. The method of producing a pair of longitudinally curved tooth gears, which comprises cutting opposite sides of each tooth space of each member of the pair simultaneously by rotating a face-mill gear cutter, which has opposite side cutting edges, in engagement with a tapered gear blank while rotating the blank on its axis and simultaneously producing an additional relative motion between the cutter and blank about an axis angularly disposed to the blank axis and offset from the blank axis and lying on a line which passes through the cutter axis and intersects the blank axis in the blank apex, the ratio of the two last named movements being varied during generation.

15. The method of producing a pair of tapered gears, which comprises cutting opposite sides of each tooth space of each member of the pair simultaneously by moving a cutting tool, which has opposite side cutting edges, in a longitudinally inclined path across the face of the blank while producing a relative rolling movement at a varying ratio between the tool and blank about an axis angularly disposed to and offset from the blank axis.

ERNEST WILDHABER.

REFERENCES CITED

The following references are of record in the file of this patent:

UNITED STATES PATENTS

| Number | Name | Date |
|---|---|---|
| 1,404,504 | Williams | Jan. 24, 1922 |
| 1,588,560 | Trbojerich | June 15, 1926 |
| 1,848,342 | Gleason | Mar. 8, 1932 |
| 2,183,285 | Wildhaber | Dec. 12, 1939 |
| 2,310,484 | Wildhaber | Feb. 9, 1943 |